(12) United States Patent
Leibler et al.

(10) Patent No.: US 9,562,132 B2
(45) Date of Patent: Feb. 7, 2017

(54) HOT-FORMABLE AND RECYCLABLE EPOXY ANHYDRIDE THERMOSETTING RESINS AND THERMOSETTING COMPOSITES

(75) Inventors: Ludwik Leibler, Paris (FR); Francois Tournilhac, Paris (FR); Damien Montarnal, Bourgoin-Jallieu (FR); Mathieu Capelot, Serquigny (FR)

(73) Assignees: Centre National De La Recherche Scientifique, Paris (FR); Arkema France, Colombes (FR)

( * ) Notice: Subject to any disclaimer, the term of this patent is extended or adjusted under 35 U.S.C. 154(b) by 76 days.

(21) Appl. No.: 13/981,401

(22) PCT Filed: Jan. 23, 2012

(86) PCT No.: PCT/EP2012/050939
§ 371 (c)(1),
(2), (4) Date: Jul. 24, 2013

(87) PCT Pub. No.: WO2012/101078
PCT Pub. Date: Aug. 2, 2012

(65) Prior Publication Data
US 2013/0300020 A1    Nov. 14, 2013

(30) Foreign Application Priority Data
Jan. 24, 2011 (FR) ..................................... 11 50546

(51) Int. Cl.
| | |
|---|---|
| C08L 63/02 | (2006.01) |
| C08L 63/04 | (2006.01) |
| C08G 59/68 | (2006.01) |
| B29B 17/00 | (2006.01) |
| B29B 17/04 | (2006.01) |
| C08G 59/42 | (2006.01) |
| C08L 63/00 | (2006.01) |
| B29K 101/10 | (2006.01) |

(52) U.S. Cl.
CPC ......... *C08G 59/685* (2013.01); *B29B 17/0042* (2013.01); *B29B 17/0404* (2013.01); *C08G 59/42* (2013.01); *C08L 63/00* (2013.01); *C08L 63/04* (2013.01); *B29K 2101/10* (2013.01); *Y02W 30/62* (2015.05); *Y02W 30/625* (2015.05)

(58) Field of Classification Search
None
See application file for complete search history.

(56) References Cited

U.S. PATENT DOCUMENTS

| | | | |
|---|---|---|---|
| 3,624,032 A | 11/1971 | Miyashiro et al. | |
| 3,932,343 A | 1/1976 | Barie, Jr. | |
| 4,131,715 A | 12/1978 | Frankel | |
| 5,332,783 A * | 7/1994 | Dillman et al. | 525/92 H |
| 2005/0009975 A1 * | 1/2005 | Hsu et al. | 524/430 |
| 2011/0319524 A1 * | 12/2011 | Leibler et al. | 523/446 |

FOREIGN PATENT DOCUMENTS

| | | | |
|---|---|---|---|
| JP | 49-53297 A | * | 5/1974 |
| JP | 2004-346114 A | * | 12/2004 |
| WO | WO 2012/064653 A1 | | 5/2012 |

OTHER PUBLICATIONS

Dow product information sheet for D.E.R. 332 bisphenol A diglycidyl ether, 2015, three pages.*
CAPLUS accession No. 1971:65014 for Japanese Patent No. 45-22015, Fujihara et al., Jul. 24, 1970, one page.*
Steinmann, "Investigations on the Curing of Epoxy Resins with Hexahydrophthalic Anhydride," Journal of Polymer Science, vol. 37, 1989, pp. 1753-1776.*
Steinmann, "Investigations on the Curing of Epoxides with Phthalic Anhydride," Journal of Polymer Science, vol. 39, 1990, pp. 2005-2026.*
Dusek et al., "Gelation in the Curing of Epoxy Resins with Anhydrides," Polymer Bulletin, vol. 7, 1982, pp. 145-152.*
Mensah, Laure, Authorized Office of EPO, International Search Report for PCT/EP2012/050939, Apr. 24, 2012.
Aflal et al., "Crack-Healing Behavior of Epoxy-Amine Thermosets," Journal of Applied Polymer Science, vol. 113, pp. 2191-2201, 2009.
Lehn, J.M., "Dynamers: dynamic molecular and supramolecular polymers," Progress in Polymer Science, 2005, vol. 30, pp. 814-831, 2005.
Skene, W.G. and Lehn, J.M., "Dynamers: Polyacylhydrazone reversible covalent polymers, component exchange, and constitutional diversity," P.N.A.S., vol. 22, pp. 8270-8275, 2004.
Chen X. et al., "A Thermally Re-mendable Cross-Linked Polymeric Material," Science 2002,vol. 295, pp. 1698-1702, 2002.
Outwater, J.O. and Gerry, D.G., "On the Fracture Energy, Rehealing Velocity and Refracture Energy of Cast Epoxy Resin," J. Adhesion, vol. 1, pp. 290-298, Oct. 1969.

* cited by examiner

*Primary Examiner* — Robert Sellers
(74) *Attorney, Agent, or Firm* — Ratnerprestia

(57) ABSTRACT

Thermosetting resins and thermosetting composites comprising the thermosetting resins are hot-formable. The compositions result from contacting at least one thermosetting resin precursor with at least one hardener selected from acid anhydrides in the presence of at least one transesterification catalyst. The thermosetting resin precursor includes hydroxyl functions and/or epoxy groups, and optionally ester functions, and the total molar quantity of the transesterification catalyst is between 5 and 25% of the total molar quantity of hydroxyl and epoxy contained in the thermosetting resin precursor. Methods for manufacturing articles comprising the thermosetting resins and methods for recycling the thermosetting resins are also disclosed.

18 Claims, 8 Drawing Sheets

6a

6b fig 7a
fig 7b
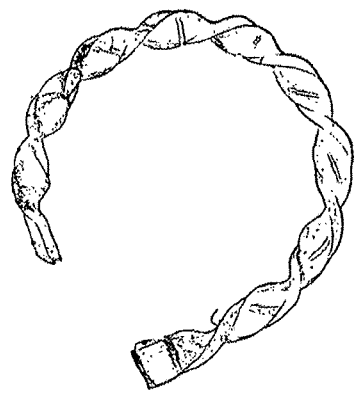
fig 7c
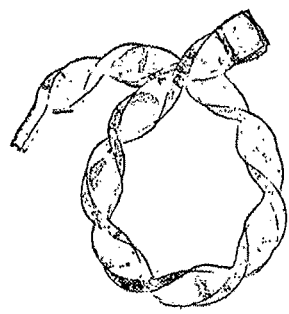
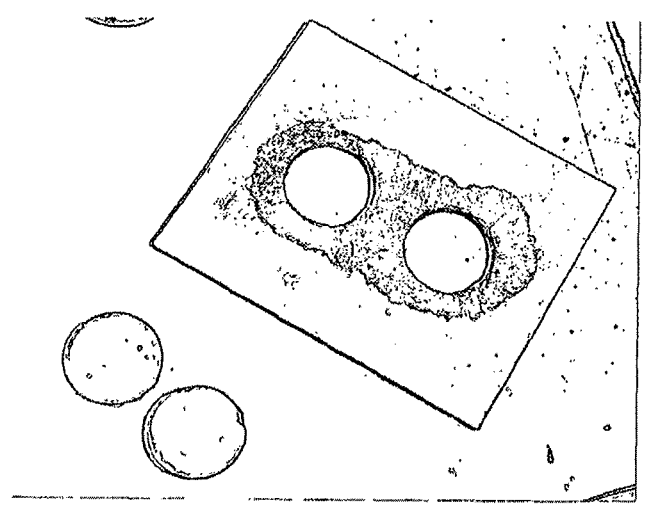
Figure 8

HOT-FORMABLE AND RECYCLABLE EPOXY ANHYDRIDE THERMOSETTING RESINS AND THERMOSETTING COMPOSITES

CROSS REFERENCE TO RELATED APPLICATIONS

This application is the U.S. National Phase application of PCT International Application No. PCT/EP2012/050939, filed Jan. 23, 2012, and claims priority to French Patent Application No. 1150546, filed Jan. 24, 2011, the disclosures of which are incorporated by reference in their entirety for all purposes.

FIELD OF THE INVENTION

The invention relates to resins and thermoset composites comprising them, these materials being able to be hot-fashioned. It also relates to a process for manufacturing these materials, to a transformation process and to a process for recycling these materials. It also relates to novel solid forms of resins and of thermoset composites that can be used in the implementation of these processes.

By definition, a thermosetting resin is a resin that hardens under the action of energy, in particular under the action of heat. Thermosets which are polymer materials manufactured from thermosetting resins have the advantage of having high mechanical, thermal and chemical strength and, for this reason, can replace metals in certain applications. They have the advantage of being lighter than metals. They may also be used as matrices in composite materials, as adhesives and as coatings.

Among the thermosetting polymers, mention may be made of unsaturated polyesters, phenoplasts, polyepoxides, polyurethanes and aminoplasts.

Thermosetting resins are moulded and crosslinked at elevated temperature or at room temperature. The processing is performed via the liquid route starting with monomers. They thus have the drawback of requiring precise manipulations and metering of liquids for their processing. The transportation of precursor compounds, in liquid form, is not satisfactory either in terms of safety.

In addition, standard thermosetting resins must be processed, and in particular they must be moulded, so as to obtain at the outset the appropriate shape for the final use. The reason for this is that no further transformation is possible once the resin is polymerised, aside from machining, which often remains delicate. Flexible or hard components and composites based on thermosetting resins are neither transformable nor fashionable, and cannot be recycled.

In parallel with thermosetting resins, a class of polymeric materials, thermoplastics, has been developed. Thermoplastics can be formed at high temperature by moulding or by injection, but have less advantageous mechanical properties and thermal and chemical strength properties than thermosets.

In addition, the forming of thermoplastics can only be performed within very narrow temperature ranges. The reason for this is that when thermoplastics are heated, they become liquid, the fluidity of which varies abruptly in the region of the melting points and the glass transition temperatures, which does not allow application thereto of a whole variety of transformation methods that exist for glass and for metals, for example.

One of the objects of the invention was the development of thermosetting resins that are hot-transformable after hardening. In particular, the materials of the invention have the property of being able to be heated to temperatures such that they become fashionable without suffering destruction or degradation of their structure. The viscosity of these materials varies slowly over a broad temperature range, with behaviour that approaches the Arrhénius law. This property allows them to undergo transformations via very varied processes that cannot be envisaged for thermoplastics. It especially makes it possible to obtain objects having shapes that are difficult or impossible to obtain by moulding or for which the production of a mould proves to be too expensive for the envisaged manufacture. Furthermore, the presence of the glass transition, which is detectable by DSC (differential thermal analysis) in the materials of the invention allows the controlled trapping and relaxation of local stresses. This situation makes it possible to envisage the design and manufacture of objects of a predefined shape, the final shape of which may be obtained simply by application of heat. The invention makes it possible to develop novel applications for thermosetting resins by facilitating their forming and their recycling. Thus, it can open up fields of application and processing methods for thermosetting resins, especially epoxy resins, that were not in any way envisagable hitherto. Finally, the invention makes it possible to overcome the problems of metering out and handling liquids that were hitherto inherent in the use of thermosets.

BACKGROUND OF THE INVENTION

It is known from the prior art (Aflal et al., *Appl. Polym. Sci.* 2009, 113, 2191) to repair an article based on epoxy resin. The solution proposed consisted in only partially reacting the epoxy functional groups during the manufacture of the article. This was able to be performed by using a sub-stoichiometric amount of hardener. To repair a damaged article, a high temperature is then applied to the part of the article concerned such that the epoxy functions that have remained free react together and form covalent bonds.

Another method known from patent application WO 02/064 653 for repairing a polymer-based article consists in dispersing in the polymer microcapsules filled with a polymerisable agent. Damage of the article brings about rupture of the microcapsules and the release of the polymerisable agent into the fracture. The polymerisation of this agent allows the fracture to be repaired.

However, these methods are limited to the repair of articles and cannot envisage the recycling of thermosetting resins or their transformation, once hardened, into an article having another shape. In addition, these repair methods allow the article to be repaired a maximum of only once or twice. Specifically, when all the epoxy functions have reacted—or when the polymerisable agents have polymerised—it is no longer possible to repair the component or the material. Finally, materials comprising capsules usually have inferior mechanical properties to those of the resins of which they are composed.

Polymeric systems using reversible covalent bonds have already been described. Thus, Lehn, J. M., *Progress Polym. Sci.*, 2005, 30, 814-831 and Skene W. G., Lehn, J. M., *P.N.A.S.* 2004, 22, 8270-8275 disclose polymeric resins that are capable of depolymerising and of repolymerising under the action of heat. The team of Professor Wudl (Chen X. et al., *Science* 2002, 295, 1698-1702) has described self-repairing materials based on the reversibility of the Diels-Alder reaction.

However, these studies concern only the repair and assembly of components and do not envisage the transformation of an article based on thermosetting resin into an article of a different shape.

The document J. O. Outwater, D. G. Gerry, *J. Adhesion*, vol. 1, 1969, 290-298 mentions the possibility of heat-repairing a fracture in an epoxy resin. It is taught in that document that the energy restitution associated with the disappearance of the fracture surfaces is responsible for this phenomenon. However, these observations have not been repeated in more than 40 years and have not led to any development. Furthermore, the resin composition that was used in that document does not correspond to the definition of the compositions of the invention and does not make it possible to transform an article or to be subjected to recycling.

Document U.S. Pat. No. 3,624,032 describes an epoxy resin composition comprising an epoxy resin, a hardener of acid anhydride type and a catalyst of acetylacetone metallic complex type. It is noted in the examples that the components are used in solid form and the working conditions described do not make it possible to dissolve the catalyst in large amount in the thermosetting resin precursor.

Document U.S. Pat. No. 3,932,343 describes an adhesive epoxy resin composition comprising an epoxy resin, an acid anhydride and a catalyst of acetylacetone metallic complex type. It is noted that the molar amounts of catalyst are less than 1.5% relative to the number of moles of epoxy functions of the resin.

According to the present invention, thermosetting resins are endowed with chemical reversibility, which, when combined with a mechanical constraint, may be used to give an article a new shape.

Furthermore, the resin compositions of the invention are also distinguished from those of the prior art in that they are not special resins but are composed of an ordinary thermosetting resin, in particular an ordinary epoxy resin, an acid anhydride hardener capable of reacting with epoxide functions generating hydroxyl and ester functions, a standard esterification catalyst and an identical or different transesterification catalyst. They differ from standard epoxy resins by the presence of amounts of transesterification catalyst higher than those usually used, since transesterification is not usually desired or envisaged.

These compositions and the processes of the invention may thus be used in all the usual applications of thermosetting resins, in particular epoxy resins, but have the advantageous properties that have been mentioned above and are illustrated in detail in the description and the implementation examples.

SUMMARY OF THE INVENTION

One subject of the invention is a thermosetting resin composition, this composition resulting from the reaction of at least one thermosetting resin precursor containing hydroxyl functions and/or epoxy groups with at least one hardener chosen from acid anhydrides, in the presence of at least one transesterification catalyst, the amount of acid anhydride being chosen such that the resin is in the form of a network maintained by ester functions and that free hydroxyl functions remain after reaction of the precursor with the hardener.

A subject of the invention is also composite materials comprising such a resin composition, a process for manufacturing an article or a material based on this resin, a process for transforming a resin-based article, a process for manufacturing an object with controlled transformation, a process for transforming an object with controlled transformation, a process for assembling and bonding materials and composites based on this resin, a process for repairing an article based on this resin, a process for recycling a resin-based article.

It also relates to articles made of thermosetting material that may be obtained via the process of the invention.

The invention is based on the transesterification reactions that may take place when a polymer contains both ester functions and hydroxyl functions.

To allow these transesterifications and to obtain materials that have a high Tg and a high rigidity, epoxy resins are polymerised using as hardeners acid anhydrides.

In order for the transesterification reaction to be exploitable over a range of temperatures that does not lead to destruction of the material and over controllable timescales, the invention makes use of a catalyst.

Relative to thermoplastic resins, which are also capable of being hot-transformed, the material according to the invention can be worked without flowing under its own weight over a much broader range of temperatures, which makes it possible to apply varied transformation methods, especially without the imperative need for moulding. These methods are of the same nature as those used in the metal and glass fields.

The resins and the materials of the invention also make it possible, by applying a sufficient temperature and an appropriate mechanical constraint, to mould articles made of a thermosetting material from thermoset material. The resins and the materials of the invention also make it possible, by applying a sufficient temperature and using good contact of the components, to assemble components by welding so as to form a more complex article. The resins and the materials of the invention also make it possible, by applying a sufficient temperature and a mechanical constraint, to repair a crack or damage caused in a component formed from the material or in a coating based on the material.

Another advantage of these resins and of these materials is that it allows the recycling of the material after use, the components being able to be reconditioned in the form of elemental units or components and then reformed again according to the invention.

BRIEF DESCRIPTION OF THE DRAWINGS

FIGS. 7*a* to 7*c* are representations in graph form from photographs of the parts formed in example 4.

FIG. 8 is a representation in graph form from photographs of the parts formed in example 5.

DETAILED DESCRIPTION OF THE INVENTION

Figure 1:
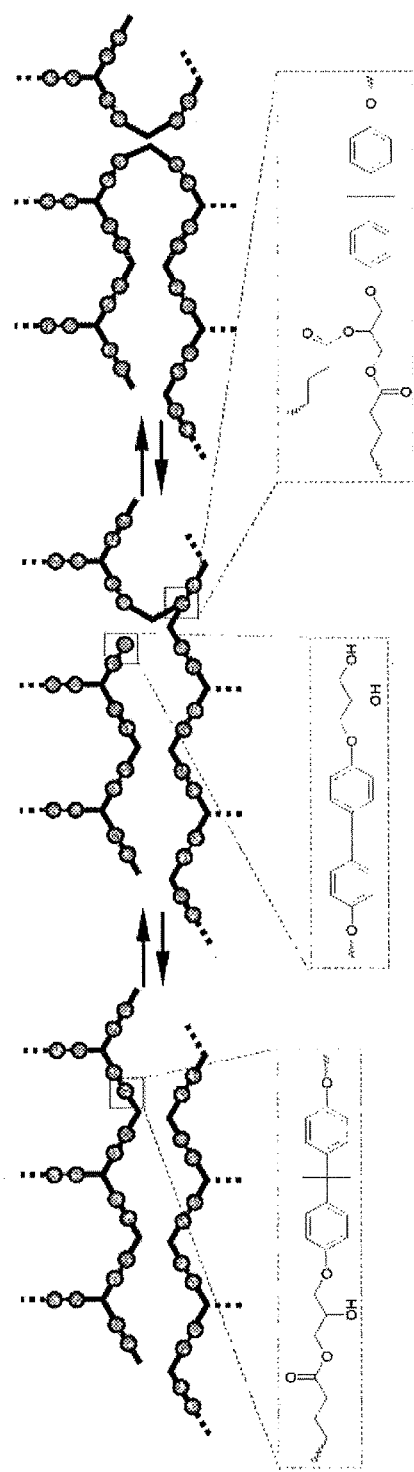
FIG. 1 is a schematic representation of the transesterification reactions within the polymer network.

One subject of the invention is a thermosetting resin composition, this composition resulting from placing in contact:

at least one thermosetting resin precursor, this thermosetting resin precursor comprising hydroxyl functions and/or epoxy groups, and optionally ester functions, with at least one hardener chosen from acid anhydrides, in the presence of at least one transesterification catalyst, and whose total molar amount is between 5% and 25% of the total molar amount of hydroxyl and epoxy contained in the thermosetting resin precursor, the amount of hardener being chosen such that the resin is in the form of a network, and:

$N_O$ denoting the number of moles of hydroxyl functions in the precursor, $N_x$ denoting the number of moles of epoxy group in the precursor, $N_A$ denoting the number of moles of anhydride functions of the hardener that are capable of forming a bond with a hydroxyl function or with an epoxy group of the thermosetting polymer precursor:

$$2N_A < N_O + 2N_x$$

Preferably, the amounts of reagents are chosen such that, after crosslinking, no unreacted epoxy functions remain.

This is reflected by the relationship $2N_A > N_x$

For the purposes of the present invention, the term "thermosetting resin precursor" means an oligomer, a prepolymer, a polymer or any macromolecule which, when reacted with a hardener, also known as a crosslinking agent, in the presence of a source of energy, especially of heat, and optionally of a small amount of catalyst, gives a polymer network that has a solid structure, hard at low temperature. The thermosetting resins known in the prior art cannot after crosslinking be transformed under the action of heat, since the reactions that led to the formation of a three-dimensional network are irreversible.

The invention more particularly concerns materials obtained by reacting thermosetting resin precursors with one or more hardeners, these materials comprising a) ester functions and b) hydroxyl functions.

These materials comprise ester functions and result from the polymerisation reaction between at least one acid anhydride and a thermosetting resin precursor comprising at least one epoxy function or one hydroxyl function. Other types of precursor and of crosslinker resulting in a resin bearing free hydroxyl groups and ester functions such as a polycarboxylic acid crosslinking agent with a resin precursor comprising epoxy groups or a polycarboxylic acid crosslinking agent with a resin precursor comprising hydroxyl groups may be envisaged.

According to the invention, precursors that comprise free hydroxyl functions and/or epoxy groups are selected. These free hydroxyl functions and epoxy groups are capable of reacting with the reactive functions of the hardener to form a three-dimensional network maintained by ester functions. It may be envisaged for the thermosetting resin precursor itself to be in the form of a polyether or polyester chain that comprises hydroxyl functions and/or epoxy groups capable of participating in a crosslinking reaction in the presence of a hardener. It may also be envisaged for the thermosetting resin precursor to be in the form of an acrylic or methacrylic resin comprising epoxy groups.

Preferentially, the invention relates to thermosetting resins of epoxy resin type. Thus, advantageously, the thermosetting resin precursor is an epoxy resin precursor. Advantageously, the epoxy resin precursor represents at least 10% by mass of the mass of thermosetting precursor composition, advantageously at least 20%, preferably at least 40% and better still at least 60%.

A thermosetting resin precursor of epoxy resin type is defined as a molecule containing at least one epoxide group. The epoxide group, also known as oxirane or ethoxyline, is represented below:

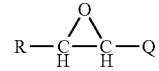

in which Q=H or Q=R', R and R' being hydrocarbon groups.

There are two major categories of epoxy resin: epoxy resins of glycidyl type, and epoxy resins of non-glycidyl type. Epoxy resins of glycidyl type are themselves classified into glycidyl ether, glycidyl ester and glycidyl amine. Non-glycidyl epoxy resins are of aliphatic or cycloaliphatic type.

Glycidyl epoxy resins are prepared via a condensation reaction of the appropriate dihydroxy compound with a diacid or a diamine and with epichlorohydrin. Non-glycidyl epoxy resins are formed by peroxidation of the olefinic double bonds of a polymer.

Among the glycidyl epoxy ethers, bisphenol A diglycidyl ether (BADGE) represented below is the one most commonly used.

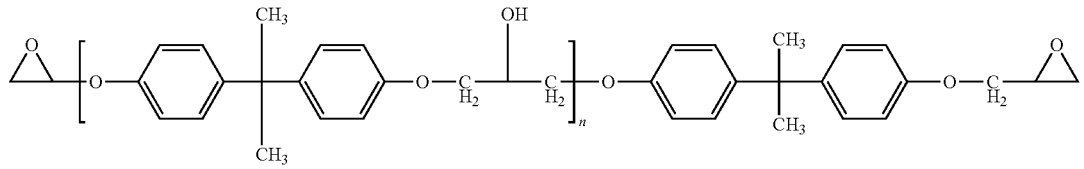

BADGE-based resins have excellent electrical properties, low shrinkage, good adhesion to numerous metals, good moisture resistance, good heat resistance and good resistance to mechanical impacts.

The properties of BADGE resins depend on the value of n, which is the degree of polymerisation, which itself depends on the stoichiometry of the synthesis reaction. As a general rule, n ranges from 0 to 25.

Novolac epoxy resins (whose formula is represented below) are glycidyl ethers of novolac phenolic resins. They are obtained by reacting phenol with formaldehyde in the presence of an acid catalyst to produce a novolac phenolic resin, followed by a reaction with epichlorohydrin in the presence of sodium hydroxide as catalyst.

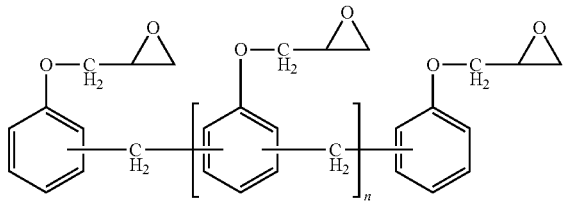

Novolac epoxy resins generally contain several epoxide groups. The multiple epoxide groups make it possible to produce resins with a high crosslinking density. Novolac epoxy resins are widely used for formulating moulded compounds for microelectronics on account of their superior resistance to high temperature, their excellent mouldability, and their superior mechanical, electrical, heat-resistance and moisture-resistance properties.

The epoxy resins to which the invention applies may be any of those provided that their precursors comprise, before reaction with the anhydride, a mean number of epoxide and hydroxyl functions per precursor such that:

$$2 < 2\langle n_X \rangle + \langle n_O \rangle.$$

This inequality should be considered in the strict sense.

$\langle n_X \rangle$ being the numerical mean of the number of epoxy functions per precursor, $\langle n_O \rangle$ being the numerical mean of the number of hydroxyl functions per precursor.

The numerical mean is defined by:

$\langle n \rangle = \mathrm{sum}(P(i)*i)/\mathrm{sum}(P(i))$, where $P(i)$ is the number of molecules containing i functions.

Preferably, $3 \leq 2\langle n_X \rangle + \langle n_O \rangle$

Even more advantageously, $4 \leq 2\langle n_X \rangle + \langle n_O \rangle$

The thermosetting resin precursor that may be used in the present invention may be chosen especially from: novolac epoxy resins, bisphenol A diglycidyl ether (BADGE), bisphenol F diglycidyl ether, tetraglycidyl methylene dianiline, pentaerythritol tetraglycidyl ether, tetrabromobisphenol A diglycidyl ether, or hydroquinone diglycidyl ether, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, polytetramethylene glycol diglycidyl ether, resorcinol diglycidyl ether, neopentyl glycol diglycidyl ether, bisphenol A polyethylene glycol diglycidyl ether, bisphenol A polypropyleneglycol diglycidyl ether, terephthalic add diglycidyl ester, poly(glycidyl acrylate), poly(glycidyl methacrylate), epoxidised polyunsaturated fatty acids, epoxidised plant oils, epoxidised fish oils and epoxidised limonene, and mixtures thereof.

Advantageously, it is chosen from: BADGE, epoxidized soybean oil and novolac resins.

A hardener is necessary to form a crosslinked three-dimensional network from an epoxy resin.

A wide variety of hardeners exists for epoxy resins. The agents commonly used for crosslinking epoxides are amines, polyamides, polycarboxylic acids, phenolic resins, anhydrides, isocyanates and polymercaptans. The reaction kinetics and the glass transition temperature, Tg, of the crosslinked resin depend on the nature of the hardener. The choice of resin and of hardener depends essentially on the desired application and properties. The stoichiometry of the epoxy-hardener system also affects the properties of the hardened material.

The resin according to the present invention is manufactured with at least one hardener chosen from acid anhydrides.

Hardeners of the acid anhydride class are, with diamines, typically used to obtain hard materials (crosslinked networks with a Tg above room temperature).

In the presence of acidic or basic catalysts, the acid anhydrides react with the epoxide groups to form esters. Hitherto, the catalysts used by those skilled in the art were optimised for this esterification reaction and are added in amounts of between 1 and 3 mol % relative to the epoxy groups [Epoxy Resins, Chemistry and Technology, second edition, published by C. A. May, Marcel Dekker, New York 1988].

When they are used in larger amount, it is generally observed that they are not dissolved in the thermosetting resin precursor, under the working conditions of the prior art.

Preferentially, cyclic anhydrides may be used as hardeners. Certain common cyclic anhydrides are shown in table 1 below.

TABLE 1

Description of the main anhydrides used as crosslinking agents with epoxides. The Tg shown corresponds to crosslinked resins with DGEBA as precursor [Epoxy Resins, Chemistry and Technology, second edition, published by C.A. May, Marcel Dekker, New York 1988].

phthalic anhydride

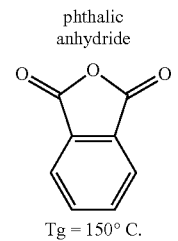

Tg = 150° C.

methylnadic anhydride

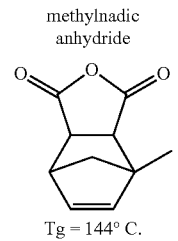

Tg = 144° C.

hexanhydrophthalic anhydride

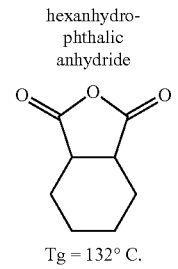

Tg = 132° C.

TABLE 1-continued

Description of the main anhydrides used as crosslinking agents with epoxies. The Tg shown corresponds to crosslinked resins with DGEBA as precursor [Epoxy Resins, Chemistry and Technology, second edition, published by C.A. May, Marcel Dekker, New York 1988].

dodecenyl-
succinic
anhydride

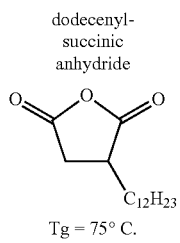

Tg = 75° C.

glutaric
anhydride

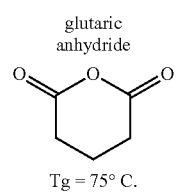

Tg = 75° C.

Mention may also be made of succinic anhydride, maleic anhydride, chlorendic anhydride, nadic anhydride, tetrachlorophthalic anhydride, pyromellitic dianhydride, 1,2,3,4-cyclopentanetetracarboxylic acid dianhydride, and aliphatic acid polyanhydrides such as polyazelaic polyanhydride and polysebacic polyanhydride.

Preferably, this hardener is chosen from: glutaric anhydride, phthalic anhydride, and hexahydrophthalic anhydride. Even more preferentially, glutaric anhydride, which has the property of facilitating the dissolution of the catalysts preferentially used, is chosen.

The hardener(s) of anhydride type may be used alone or as a mixture with other types of hardener, especially hardeners of amine type or hardeners of acid type.

A hardener of amine type may be chosen from primary or secondary amines containing at least one $NH_2$ function or two NH functions and from 2 to 40 carbon atoms. This amine may be chosen, for example, from aliphatic amines such as diethylenetriamine, triethylenetetramine, tetraethylenepentamine, dihexylenetriamine, cadaverine, putrescine, hexanediamine, spermine, isophorone diamine, and also aromatic amines such as phenylenediamine, diaminodiphenylmethane, diaminodiphenyl sulfone and methylenebischlorodiethylaniline.

Advantageously, when an amine hardener is used in the mixture, the amine/epoxy ratio is limited so that, in the absence of ester bonds, the tertiary amine bonds thus created are not sufficient to pass the gel point. In practice, a person skilled in the art can rely on the vast literature existing on epoxy-amine systems to select the appropriate composition. The test described below which concerns the formation of a network may be used to check that the gel point is not exceeded:

In a material, it is considered that the gel point is not reached as long as a cylindrical post made from this material, with an initial height of approximately 1 cm at room temperature and a diameter of 1 cm, after having been left for 10 hours at a temperature of 50° C. above the Tg (measured by DSC) and then equilibrated for 30 minutes at room temperature, has a final height that differs by more than 20% from the initial height.

As acids that may be used in the invention, mention may be made of carboxylic acids comprising 2 to 40 carbon atoms, such as linear diacids (glutaric, adipic, pimelic, suberic, azelaic, sebacic or dodecanedioic and homologues thereof of higher masses) and also mixtures thereof, or fatty acid derivatives, trimers (oligomers of 3 identical or different monomers) and mixtures of fatty acid dimers and trimers, in particular of plant origin. These compounds result from the oligomerization of unsaturated fatty acids such as: undecylenic, myristoleic, palmitoleic, oleic, linoleic, linolenic, ricinoleic, eicosenoic or docosenoic acid, which are usually found in pine oil, rapeseed oil, corn oil, sunflower oil, soybean oil, grapeseed oil, linseed oil and jojoba oil, and also eicosapentaenoic acid and docosahexaenoic acid, which are found in fish oils.

As acids that may be used in the invention, mention may also be made of aromatic carboxylic acids comprising 2 to 40 carbon atoms, for instance aromatic diacids such as phthalic acid, trimellitic acid, terephthalic acid or naphthalenedicarboxylic acid.

Advantageously, when one or more hardeners other than the anhydride is used as a mixture with the hardener(s) of anhydride type, the anhydride represents at least 10 mol %, preferably at least 20 mol %, advantageously at least 40 mol % and better still at least 60 mol % relative to the hardeners as a whole.

According to the prior art, in equimolar ratios of anhydride and epoxy groups, networks of highly crosslinked polyester are obtained, in which the diepoxides and the cyclic anhydrides lead to units respectively having a functionality of 4 and of 2.

In equimolar ratios of the anhydride and epoxy groups, these networks do not have the free hydroxyl groups necessary for a transesterification reaction. According to the invention, a compromise must be chosen between the presence of free hydroxyls for performing transesterification reactions and high crosslinking density giving a solid and mechanically strong material.

For the purposes of the present invention, a network is formed once there is a continuous path formed from a succession of monomers united by ester bridges, this path traversing the sample from end to end. These monomers may originate from the thermosetting precursors and/or from the hardeners. A person skilled in the art knows theoretical and/or empirical guides for determining the compositions that can produce a network from the envisaged resins and hardeners (cf. for example, P. J. Flory *Principles of Polymer Chemistry* Cornell University Press Ithaca-NY 1953).

According to the invention, the hardener is used in an amount sufficient to form a network. In practice, the formation thereof is ensured if, after formation of the ester bridges, a cylindrical post made of this material, with an initial height of approximately 1 cm at room temperature and a diameter of 1 cm, after having been left for 10 hours at a temperature of 50° C. above the Tg (measured by DSC) and then equilibrated for 30 minutes at room temperature, has a final height differing by less than 20% from the initial height.

When a precursor comprising at least two epoxy functions per molecule, and a cyclic anhydride, are used, using an equimolar ratio of acids and of epoxy, the conditions already stated are sufficient to obtain a network:

$2N_A < N_O + 2N_x$ $2N_A > N_x$

At least one of the catalysts must be chosen from transesterification catalysts. Certain transesterification catalysts make it possible to catalyse the reaction of epoxides with the hardener. However, it may also be envisaged to use a specific catalyst for opening epoxides in addition to the transesterification catalyst.

The transesterification catalysts are used in the invention in an amount ranging from 5 mol % to 25 mol % relative to the total molar amount of hydroxyl and of epoxy contained in the thermosetting resin precursor. This proportion of catalyst is significantly higher than the amounts used in the prior art.

According to the invention, the term "transesterification catalyst" means a compound that satisfies the following test:

Catalyst Test:

Preparation of the Ester E1:

6.1 mmol of octanoic acid (Mw=144.2 g/mol, m=0.88 g) and 0.37 mmol (6 mol %) of catalyst C1, 2-methylimidazole (2-MI, Mw=82.1 g/mol, m~30 mg) are placed in a test tube. At room temperature, the octanoic acid is in liquid form, whereas the 2-MI is a solid that sediments to the bottom of the tube. At 120° C. and with slight manual stirring, the catalyst is rapidly dissolved. 6.1 mmol of benzyl glycidyl ether (Mw=164.2 g/mol, m=1 g) are added and the reaction mixture is stirred in order to homogenise it.

The mixture is heated under a stream of argon (~40 mL/min) at 120° C.

The reaction progress is measured by IR spectroscopy by monitoring the intensity of the $u_{C=O}$ bands of the ester at 1735 cm$^{-1}$ and of the acid at 1705 cm$^{-1}$ and also $\delta_{C-O-C}$ (ring vibration) of the epoxy at 915 cm$^{-1}$.

After one hour, it is found by this means that the conversion no longer changes. $^{13}$C NMR analysis (CDCl$_3$/TMS) confirms the disappearance of the [COOH] signal at 181 ppm and the appearance of the [COOR] signal at 174 ppm.

The product obtained at the end of this reaction is the ester E1, which is the product of esterification between octanoic acid and benzyl glycidyl ether, which is confirmed by the $^1$H and $^{13}$C NMR analysis.

Preparation of the Ester E2:

The protocol is identical to the preceding. The reaction mixture is then formed from 6.7 mmol of phenyl glycidyl ether (Mw=150.2 g/mol, m=1 g), 6.7 mmol of decanoic acid (Mw=172.3 g/mol, m=1.15 g) and 0.4 mmol of 2-MI (6 mol %, m~33 mg). The decanoic acid and the catalyst C1 are in solid form: the mixture is thus homogenised with gentle stirring at 120° C. The reaction is performed at 120° C. under a stream of 40 mL/min of nitrogen. The reaction progress is monitored in the same manner as previously: the reaction is complete after one hour. This is confirmed by $^{13}$C NMR. The product obtained is the ester E2.

Transesterification Tests:

0.65 mmol of E1, 0.65 mmol of E2 and 0.032 mmol (5 mol %) of catalyst C2, which is the test product, are placed in a test tube. The mixture is homogenised by heating to 150° C. and gently stirring. The reaction mixture is heated to 150° C. using an oil bath under a stream of 40 mL/min of nitrogen.

Samples are taken regularly in order to monitor the transesterification kinetics. Each sample taken is analysed by gas chromatography coupled to mass spectrometry (GC-MS) using a Shimadzu GCMS-QP 2010S machine. The chromatographic analysis is performed with a Shimadzu GC-2010 machine equipped with a Supelco capillary column (model 28041-U) 12 m long, 0.2 mm inside diameter, packed with a film of 0.33 µm of non-polar poly(dimethylsiloxane) stationary phase (Equity™-1 phase). The vector gas is helium, with an inlet pressure of 34.6 kPa, a total flow rate of 44.4 mL/min, a column flow rate of 0.68 mL/min, a linear velocity of 48 cm/s and a purge flow rate of 3 mL/min.

Injection of 1 µL of a solution in methanol of the product to be analysed at a concentration of between 1 mg/g to 5 mg/g is performed at an injection temperature of 250° C. in split mode, with a split ratio of 60%. The column temperature cycle after injection is composed of a plateau at 80° C. for 30 seconds followed by a ramp of 24° C./minute up to 280° C. This temperature is then kept constant for 7 minutes, for a total analysis time of 16 minutes.

The GC chromatograph is coupled to a Shimadzu electron-impact mass spectrometer (EIMS) at 70 eV. The temperature of the ion source and that of the interface are, respectively, 200 and 300° C.

Figure 2:
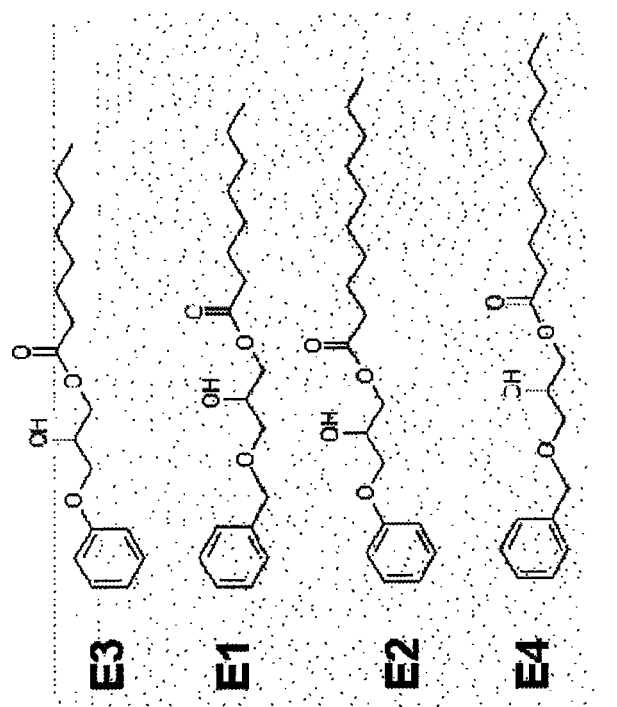
FIG. 2 is a chromatogram of the products contained in the reaction medium obtained from the transesterification test.
Figure 2:
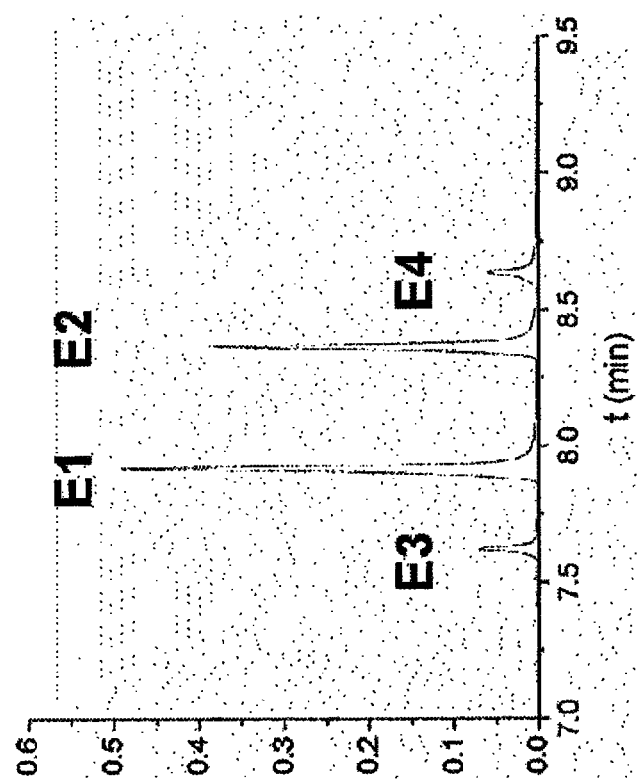
Figure 3:
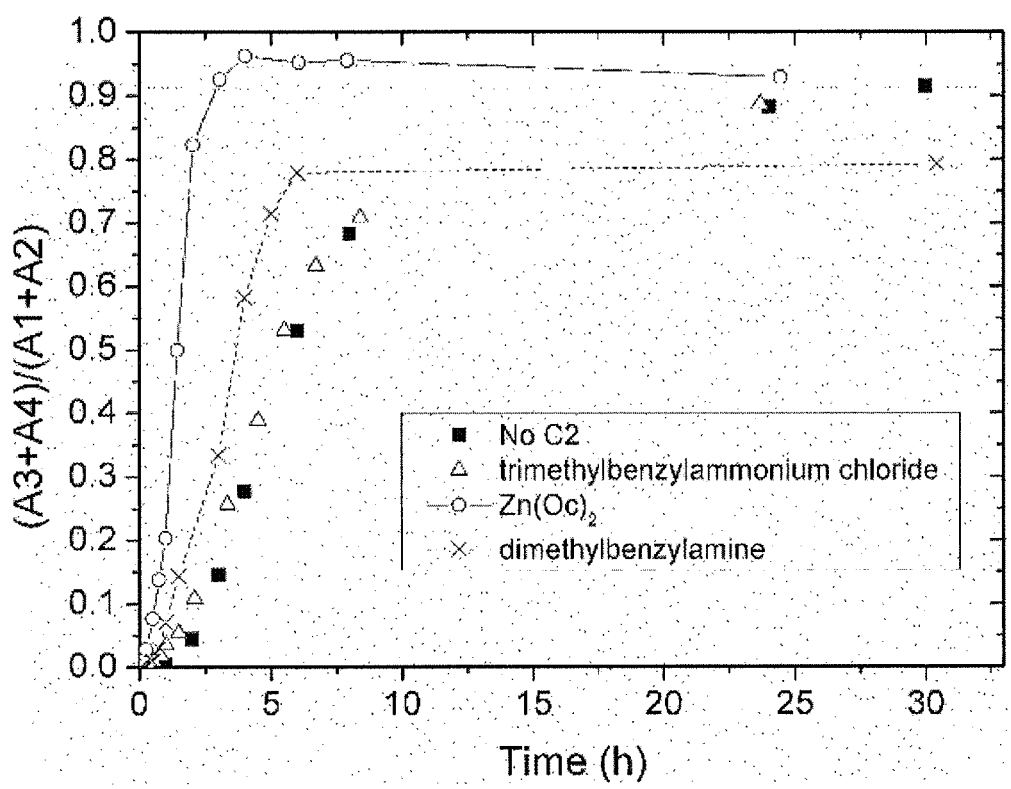
FIG. 3 is a graphic representation of the transesterification kinetics in the transesterification test.

The area of the signals present in the chromatogram of FIG. 2 corresponding to the monoesters E1, E2, E3 and E4, which are exchange products, is measured (these areas are noted A1, A2, A3 and A4, respectively). The monoesters are identified by means of the fragmentation obtained by mass spectrometry. The retention times corresponding to the monoesters E1, E2, E3 and E4 are, respectively, 7.9, 8.4, 7.6 and 8.6 min. The kinetics are obtained by plotting the ratio of the areas (A3+A4)/(A1+A2) as a function of the sampling time, and illustrated in FIG. 3.

Advantageously, a product is considered as being a catalyst for the purposes of the present invention if the time for which the ratio reaches 0.9 is less than 5 hours.

Preferably, the catalyst is chosen from metal salts of zinc, tin, magnesium, cobalt, calcium, titanium and zirconium. Advantageously, the catalyst is chosen from those having transesterification kinetics comparable to that of zinc, tin, magnesium, cobalt, calcium, titanium and zirconium metal salts. The catalyst may also be chosen from catalysts of organic nature, such as may also be chosen from catalysts of organic nature, such as: benzyldimethylamine, benzyltrimethylammonium chloride.

These catalysts are generally in solid form and, in this case, advantageously in the form of a finely divided powder.

A heterogeneous catalyst may be used, i.e. a catalyst that is not in the same phase as the reagents, but a homogeneous catalyst is advantageously used, which is present in the same phase as the reagents.

As is explained below in the description of the process, the catalyst is dissolved in the thermosetting resin precursor or in the hardener.

The catalyst, solid or liquid, is preferably soluble in the thermosetting resin precursor. The catalyst, solid or liquid, is advantageously soluble in the thermosetting resin precursor under the implementation conditions of the process of the invention.

Preferably the catalyst is chosen from: zinc acetylacetonate (Zn(Acac)) and benzyldimethylamine.

Among the epoxide-opening catalysts that may be used in addition to the transesterification catalyst, mention may be made of: tin tetrachloride, organoboron salts, trialkylamines, hexamethylenetetramine, divalent tin salts, aniline-formaldehyde condensates, tertiary amines, N,N-alkanolamines, metal chelates comprising epoxy groups, amine salts of polyacids, uranium salts, trialkanolamine borates, organo-substituted phosphines, fluoroborates, quaternary ammonium salts, quaternary monoimidazoline salts, dicyanodiamides and imidazolines.

When an epoxide-opening catalyst is used, it is advantageously present in amounts ranging from 0.1 mol % to 5 mol % relative to the number of moles of epoxide groups.

A subject of the invention is also a kit for the preparation of a thermosetting resin or for the preparation of a composite material comprising a thermosetting resin as described above comprising at least one first composition comprising a thermosetting resin precursor, this thermosetting resin precursor comprising hydroxyl functions and/or epoxy groups, and optionally ester functions, at least one second composition comprising a hardener chosen from acid anhydrides and at least one transesterification catalyst, the first and the second composition being in conditioning suitable for preventing the crosslinking reaction between the precursor and the hardener from taking place without intervention of an operator.

Such a kit makes it possible to prepare a thermosetting resin, the first and second compositions being mixed together just before use.

Such conditioning may consist of a container comprising two or three internal compartments for separately storing each of the components, it being understood that the catalyst may optionally be stored in the same compartment as the precursor or as the hardener. The catalyst is preferentially stored in the same compartment as the thermosetting resin precursor. A means may be provided for placing in contact the contents of the various compartments so as to initiate the crosslinking in the container. A kit consisting of two or three separate flasks combined in the same packaging and each comprising suitable amounts of each product for the preparation of the thermosetting resin, so as to save the user from performing weighing and/or metering operations, may also be provided.

According to one variant, the kit for the preparation of a thermosetting resin may consist of a single container, comprising the mixture in appropriate amounts of the three components: precursor, anhydride and catalyst. Specifically, in the absence of heating, and unlike epoxy-amine mixtures, the epoxy precursor+anhydride mixtures have a stability of about two months at room temperature, even in the presence of catalyst. The operator's intervention is then limited to heating.

A subject of the invention is also compositions of thermosetting composite material comprising at least one thermosetting resin whose composition has been described above. Such a material may comprise, besides the thermosetting resin(s) according to the invention: one or more polymers, pigments, dyes, fillers, plasticizers, fibres, flame retardants, antioxidants, lubricants, wood, glass, metals.

Among the polymers that may be used mixed with the thermosetting resin composition of the invention, mention may be made of: elastomers, thermoplastics, thermoplastic elastomers, impact additives.

The term "pigments" means coloured particles that are insoluble in the epoxy resin. As pigments that may be used in the invention, mention may be made of titanium oxide, carbon black, carbon nanotubes, metal particles, silica, metal oxides, metal sulfides or any other mineral pigment; mention may also be made of phthalocyanins, anthraquinones, quinacridones, dioxazines, azo pigments or any other organic pigment, natural pigments (madder, indigo, crimson, cochineal, etc.) and mixtures of pigments. The pigments may represent from 0.05% to 15% by weight relative to the weight of the material.

The term "dyes" means molecules that are soluble in the epoxy resin and that have the capacity of absorbing part of the visible radiation.

Among the fillers that may be used in the thermosetting resin composition of the invention, mention may be made of: silica, clays, calcium carbonate, carbon black, kaolin, whiskers.

The presence in the thermosetting resin compositions of the invention of fibres such as glass fibres, carbon fibres, polyester fibres, polyamide fibres, aramid fibres, cellulose and nanocellulose fibres or plant fibres (linseed, hemp, sisal, bamboo, etc.) may also be envisaged.

It may also be envisaged for the thermosetting resin compositions of the invention to be used for manufacturing sandwich materials by alternating superposition of layers of resin with layers of wood, metal or glass.

The presence in the thermosetting resin composition of pigments, dyes or fibres capable of absorbing radiation may be used to ensure the heating of an article based on such a resin by means of a radiation source such as a laser. The presence in the thermosetting resin composition of pigments, fibres or electrically conductive fillers such as carbon black, carbon nanotubes, carbon fibres, metal powders or magnetic particles may be used to ensure the heating of an article based on such a resin by the Joule effect, by induction or by microwaves. Such heating may allow the use of a process for manufacturing, transforming or recycling an article made of thermosetting resin according to a process that is described below.

A subject of the invention is also a process for manufacturing an article based on a thermosetting resin composition as described above, this process comprising:

a) the placing in contact of a first composition comprising at least one thermosetting resin precursor with a second composition comprising at least one hardener chosen from acid anhydrides, in the presence of at least one transesterification catalyst, b) the forming of the composition obtained from step a), c) the application of energy for hardening the resin, d) cooling of the hardened resin.

The placing in contact of the components may take place in a mixer of any type known to those skilled in the art. The application of energy for hardening the resin in step c) of the process may consist, in a known manner, of heating at a temperature ranging from 50 to 250° C. The cooling of the hardened resin is usually performed by leaving the material to return to room temperature, with or without use of a cooling means.

The process is advantageously performed so as to reach or exceed the gel point of the resin after step d). In particular, the process of the invention advantageously comprises the application of sufficient energy in step c) for the gel point of the resin to be reached or exceeded.

For the purposes of the present invention, the term "article" means a thermoset component based on a material comprising a thermosetting resin, in particular an epoxy resin, as described above. It may also be an object made of composite material, a coating, a terminal, a bead or a film of adhesive based on thermosetting resin. It may especially be envisaged to introduce before, during or after step a) one or more additional components that may be chosen especially from polymers, pigments, dyes, fillers, plasticizers, fibres, flame retardants, antioxidants, lubricants, wood, glass and metals. Advantageously, in the objects according to the invention, the resin has reached or exceeded the gel point.

The articles according to the invention may also consist of coatings that are deposited on a support, for instance a protective layer or a paint. They may also consist of an adhesive material.

In practice, the catalyst is first dissolved in the composition comprising the thermosetting resin precursor or in the composition comprising the hardener, and the two compositions are then mixed together. An article resulting from the forming and hardening of the resin composition described above also forms part of the invention.

In particular, the invention relates to an article based on thermosetting resin that may be obtained via the process described above.

In particular, it relates to an object, or thermoset material, based on thermosetting resin, this resin having reached or exceeded the gel point.

The term "application of energy for hardening the resin" generally means raising the temperature.

Usually, an article based on thermosetting resin is manufactured by mixing the following components: precursor, hardener, catalyst and additives, introduction in a mould and raising the temperature. The means for manufacturing such an article are well known to those skilled in the art.

However, by means of the resin compositions of the invention, other methods for forming the article than moulding may be envisaged, such as filament winding, continuous moulding or film-insert moulding, infusion, pultrusion, RTM (resin transfer moulding), RIM (reaction-injection moulding) or any other method known to those skilled in the art, as described in the publications "Epoxy Polymer", edited by J. P. Pascault and R. J. J. Williams, Wiley-VCH, Weinheim 2010 or "Chimie industrielle", by R. Perrin and J. P. Scharff, Dunod, Paris 1999.

With the application of such a process to the thermosetting resin compositions of the prior art, once the resin has hardened, the article can no longer be transformed or repaired or recycled. In fact, once the gel point of the resin is reached or exceeded, a thermosetting resin article of the prior art can no longer be transformed or repaired or recycled.

The application of a moderate temperature to such an article according to the prior art does not lead to any observable or measurable transformation, and the application of a very high temperature leads to degradation of this article.

In contrast, the materials based on thermosetting resin of the invention, on account of their particular composition, can be transformed, repaired and recycled by raising the temperature of the article.

Below the Tg temperature, the polymer is vitreous and has the behaviour of a rigid solid body.

The materials resulting from the hardening of the thermosetting resin described above constitute another object of the invention.

Above the glass transition temperature Tg, the thermoset material of the invention has viscoelastic behaviour over a broad temperature range, with a storage modulus of between $5\times10^5$ and $5\times10^7$ Pa according to the composition. This storage modulus may be determined by means of a mechanical dynamic measurement at 1 Hz known to those skilled in the art. In a creep experiment, a strain of elastic nature at very short times is observed, after which, unlike standard thermoset materials, non-recoverable strain varying virtually linearly as a function of time is observed. This virtually linear evolution makes it possible to define a viscosity according to the relationship $\sigma/\eta=d(\epsilon)/dt$, where $\sigma$ is the applied stress in Pa, $\epsilon$ is the strain in mm/mm, t is the time in seconds and $\eta$ is the viscosity in Pa·s.

According to the composition, the viscosity determined using a stress of 1 MPa for the creep ranges between $10^5$ Pa·s and $10^{10}$ Pa·s at a temperature of Tg+150° C. for the materials according to the invention. The non-recoverable strain thus measured is thus greater than 10% after a creep time of 20 minutes.

The invention thus also relates to a thermoset material based on thermosetting resin, whose viscosity is between $10^5$ and $10^{10}$ Pa·s at temperatures of between 150° C. and 300° C.

This slow variation in viscosity over a broad range of temperature makes the behaviour of the material comparable to that of inorganic glasses and allows additional transformation processes to be applied thereto relative to those that can be applied to thermoplastics.

For the same composition, the viscosity of the material follows a dependency of Arrhenius type as a function of the temperature, and does so over a broad temperature interval (typically 100° C. to 300° C.): $\eta=B\times\exp(-A/T)$, where A is the activation parameter in $K^{-1}$, T is the absolute temperature in K, and B is a constant in Pa·s. The activation parameter value is typically between 7000 and 12000 $K^{-1}$.

From a practical point of view, this means that, within a broad temperature range, an article, or thermoset material, can be fashioned by applying stresses of the order of 1 to 10 MPa without, however, flowing under its own weight.

In the same way, it is possible to deform the article, or the thermoset material, at a temperature greater than the Tg temperature, and then in a second stage, the internal stresses can be removed at a higher temperature.

Without forasmuch being bound to this explanation, the inventors think that the transesterification exchanges are the cause of the relaxation of constraints and of the variation in viscosity at high temperatures. In terms of application, these materials can be treated at high temperatures, where a low viscosity allows injection or moulding in a press. It should be noted that, contrary to Diels-Alder reactions, no depolymerisation is observed at high temperatures and the material conserves its crosslinked structure. This property allows the repair of two parts of an article. No mould is necessary to maintain the shape of the components during the repair process at high temperatures. Similarly, components can be transformed by application of a mechanical constraint to only one part of an article without the need for a mould, since the material does not flow. However, large-sized components, which have more of a tendency to collapse, can be maintained by a support frame, as in the case of glassworking. The bonding and repair of objects constitute a particular case of transformations of objects according to the invention.

Another subject of the invention is thus a process for transforming at least one article made from a material as described above, this process comprising: the application to the article of a mechanical constraint at a temperature (T) above room temperature.

Preferably, in order to enable transformation within a time that is compatible with industrial application of the process, the process comprises the application to the article of a mechanical constraint at a temperature (T) above the glass transition temperature Tg of the material of which the article is composed.

Usually, such a process is followed by a step of cooling to room temperature, optionally with application of at least one mechanical constraint.

For the purposes of the present invention, the term "mechanical constraint" means the application of a mechanical force, locally or to all or part of the article, this mechanical force tending towards forming or deforming the article.

Among the mechanical constraints that may be used, mention may be made of: pressure, moulding, blending, extrusion, blow-moulding, injection-moulding, stamping, twisting, flexing, pulling and shearing.

It may be, for example, twisting applied to a strip of material of the invention. It may be a pressure applied by means of a plate or a mould onto one or more faces of an article of the invention, stamping a pattern in a plate or sheet made of material of the invention. It may also be a pressure exerted in parallel onto two articles made of materials of the invention in contact with each other so as to bring about bonding of these articles. In the case where the article consists of granules of material of the invention, the mechanical constraint may consist of blending, for example in a blender or around an extruder screw. It may also consist of injection-moulding or extrusion. The mechanical constraint may also consist of blow-moulding, which may be applied, for example, to a sheet of material of the invention. The mechanical constraint may also consist of a plurality of separate constraints, of identical or different nature, applied simultaneously or successively to all or part of the article or in a very localised manner.

This transformation may include mixing or agglomeration with one or more additional components chosen from: one or more polymers, pigments, dyes, fillers, plasticizers, fibres, flame retardants, antioxidants, lubricants.

Assembly, bonding and repair are particular cases of the transformation process described above.

This raising of the temperature of the article may be performed by any known means such as heating by conduction, convection, induction, spot heating, infrared, microwave or radiant heating. The means for bringing about an increase in temperature of the article in order to perform the processes of the invention comprise: an oven, a microwave oven, a heating resistance, a flame, an exothermic chemical reaction, a laser beam, a hot iron, a hot-air gun, an ultrasonication tank, a heating punch, etc.

The temperature increase may or may not be brought about in stages, and its duration is adapted to the expected result as a function of the indications that will be given and of the examples detailed below.

The process of the invention is based on transesterification reactions that are promoted by the presence of the catalyst and by the free OH functions within the polymer network in the materials of the invention according to dynamics illustrated in FIG. 1 attached hereto.

Although the material does not flow during the transformation, by means of the transesterification reactions, by selecting an appropriate temperature, heating time and cooling conditions, the new shape may be free of any residual constraint. The material is thus not embrittled or fractured by the application of the mechanical constraint. Furthermore, if the component is subsequently reheated, it will not return to its first shape. Specifically, the transesterification reactions that take place at high temperature promote a reorganisation of the crosslinking points of the polymer network so as to cancel out the mechanical constraints. A sufficient heating time makes it possible to completely cancel these mechanical constraints internal to the material that have been caused by the application of the external mechanical constraint.

This method thus makes it possible to obtain stable complex shapes, which are difficult or even impossible to obtain by moulding, from simpler elemental shapes. Notably, it is very difficult to obtain by moulding shapes resulting from twisting.

Additionally, the choice of appropriate temperature, heating time under stress and cooling conditions makes it possible to transform an object while at the same time controlling the persistence of certain internal mechanical stresses in the object, and then, if the part is subsequently heated, a controlled transformation of the part by controlled release of the stresses may be performed.

A subject of the invention is thus also a process for manufacturing an object with programmed post-transformation, this process comprising the application to a first object of a mechanical stress at a temperature (T) above room temperature, preferentially above the glass transition temperature Tg of the material of which the first object is composed, followed by its cooling, the temperature T and its application time being controlled such that an internal mechanical stress allowing the subsequent transformation is conserved in the object after cooling.

Advantageously, the first object to which this process is applied is based on a thermoset resin which has reached or exceeded the gel point.

For example, mention may be made of a plate made of material of the invention which is folded at a temperature above the Tg of the material of which it is composed, and then rapidly cooled before relaxation of the internal stresses. Subsequent heating of the folding zone without application of an external mechanical stress makes it possible to unfold the object at a chosen angle corresponding to the release of the residual stress.

A subject of the invention is also a process for transforming an object with programmed post-transformation, this process comprising the application to an object with programmed post-transformation as described above of a temperature (T) above room temperature, preferentially above the glass transition temperature Tg of the material of which the object is composed, the temperature, its application time and its localization being chosen so as to release all or some of the internal mechanical stresses of the object. This controlled raising of temperature is followed by cooling.

Advantageously, the object with programmed post-transformation to which this process is applied is based on a thermoset resin which has reached or exceeded the gel point.

An article made of material of the invention may also be recycled:

either via direct treatment of the article: for example, the broken or damaged article is repaired by means of a transformation process as described above and may thus regain its prior working function or another function;

or the article is reduced to particles by application of mechanical grinding, and the particles thus obtained may then be used in a process for manufacturing an article. In particular, according to this process, particles of material of the invention are simultaneously subjected to a raising of temperature and a mechanical constraint allowing them to be transformed into an article.

The mechanical constraint that allows the transformation of particles into an article may, for example, comprise compression in a mould, blending or extrusion.

This method thus makes it possible, by applying a sufficient temperature and an appropriate mechanical constraint, to mould articles from the thermoset material. In particular, it makes it possible to mold objects from the material based on thermoset resin which has reached or exceeded the gel point.

Another advantage of the invention is that it allows the manufacture of materials made of thermosetting resins from liquid starting materials, in the form of elemental components or units based on thermoset resin which has reached or exceeded the gel point: particles, granules, beads, rods, plates, sheets, films, strips, stems, tubes, etc. via any process known to those skilled in the art. These elemental components may then be transformed under the combined action of heat and of a mechanical constraint into articles of the desired shape: for example, strips may, by stamping, be chopped into smaller pieces of chosen shape, sheets may be superposed and assembled by compression. These elemental components based on thermosetting material, especially based on epoxy resin, are easier to store, transport and handle than the liquid formulations from which they are derived. Specifically, the step for transforming the components according to the invention may be performed by the final user without chemical equipment (no toxicity or expiry date or VOC, and no weighing out of reagents).

A subject of the invention is thus a process for manufacturing at least one article based on thermosetting resin, which is a particular case of the transformation process already described, this process comprising:

a) the use as starting material of a material or article of the invention in the form of an elemental unit or an assembly of elemental units, b) the simultaneous application of a mechanical constraint and an increase of temperature to form the article, c) cooling of the article resulting from step b).

In particular, in step a), the material or object of the invention is advantageously based on thermoset resin which has reached or exceeded the gel point.

Another advantage of this process is that it allows the recycling of the material after use, it being possible for articles to be reconditioned in the form of elemental units or components and then reformed again according to the invention.

One subject of the invention is thus a process for recycling an article made of material of the invention, this process comprising:

a) the use of the article as starting material, b) the application of a mechanical constraint, and optionally of a simultaneous increase of temperature, to transform this article into an assembly of elemental units, c) cooling of this assembly of elemental units.

In particular, in step a), the material or object of the invention is advantageously based on thermoset resin which has reached or exceeded the gel point.

The term "elemental units" means components that have a standardised shape and/or appearance that are suited to their subsequent transformation into an article, for instance: particles, granules, beads, rods, plates, sheets, films, strips, stems, tubes, etc. The term "assembly of elemental units" means at least two elemental units, better still at least three, even better still at least 5, preferentially at least 10, even more preferentially at least 100, advantageously at least $10^3$, even more advantageously at least $10^4$ and preferentially at least $10^5$.

The materials and processes of the invention make it possible to overcome the drawbacks of the materials of the prior art, which are the non-transformability and the non-recyclability of articles based on epoxy resin. They especially make it possible to transform and recycle as many times as desired the article based on epoxy resin. The process also makes it possible to manufacture epoxy resins in a solid form, which is easy to store, to transport and to handle, these new forms of epoxy resin, referred to as elemental units, being useable directly for the manufacture of articles by applying a transformation step conventionally used for thermoplastics. Finally, these resins and these materials allow new applications of thermosetting resins by the application of new transformation methods for these resins and by the possibility of programming controlled transformations of these materials.

The fields of application of these materials are all those of thermosetting resins: materials and composites for motor vehicles, for aeronautical construction, electronics, sport, construction, printing and packaging.

EXPERIMENTAL SECTION

Example 1

Synthesis and Study of an Epoxy Anhydride Network According to the Invention in the Presence of 0.5 Molar Equivalent of Anhydride Relative to the Epoxide Groups and 5% Catalyst Synthesis of the Material:

10.69 g of DER 332 epoxy resin (Dow, equivalent epoxy mass: 174 g/eq.) and 0.81 g of zinc acetylacetonate (CAS 14024-63-6, MW=263.6 g/mol) corresponding to 0.05 gram-atom of zinc per epoxy function are placed in a Teflon beaker. The reagents are mixed together while heating using a hot air gun (T≈180° C.) until dissolution is complete. 3.5 g of glutaric anhydride (CAS 108-55-4, MW=114.1) are then added and mixed until dissolution is complete. The mixture is poured into a mold 100×100×1.4 mm in size between two sheets of nonstick silicone paper, and is then press-baked at 140° C. for 8 hours.

A measurement of the infrared spectrum taken on the material at the end of the reaction reveals the total disappearance of the signals for the anhydride (1810 $cm^{-1}$) and for the epoxy (915 $cm^{-1}$). On the sample after polymerization, the characteristic band of the ester functions at 1735 $cm^{-1}$ and a broad absorption peak at 3200-3600 $cm^{-1}$) characteristic of the hydroxyl groups are recorded.

Properties of the Material

Figure 4:
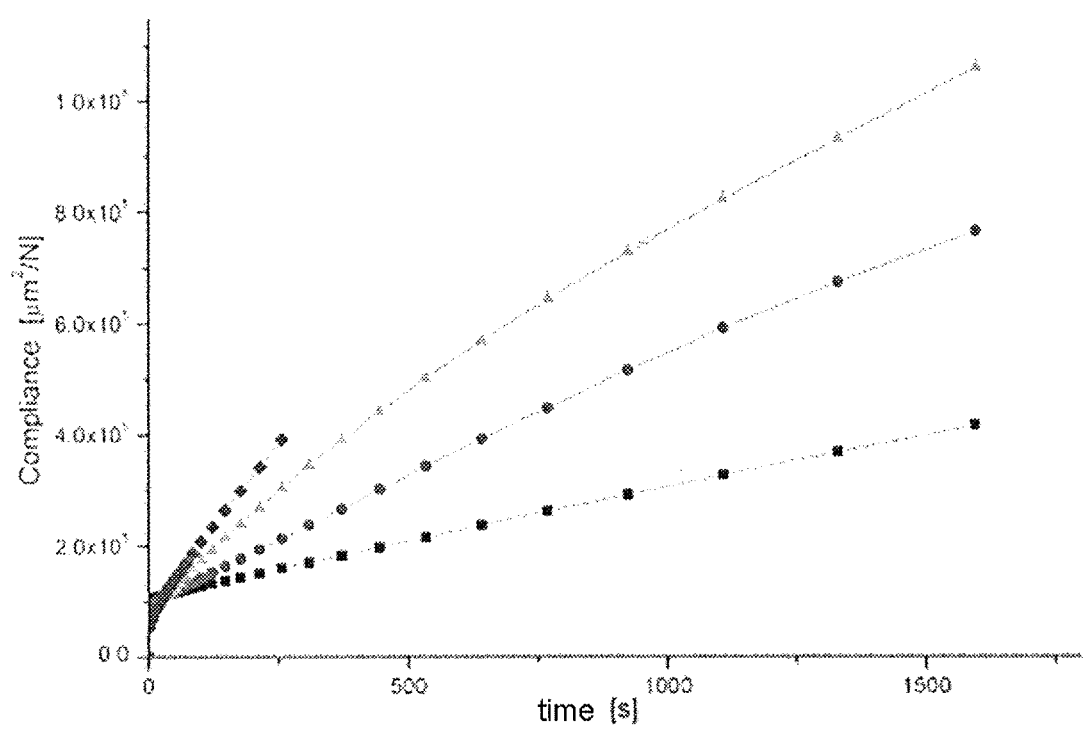
FIG. 4 shows curves of creep of the material of example 1 performed at various temperatures (squares: 160° C.; circles: 180° C.; triangles: 200° C.; diamonds: 220° C.) at a stress of 1 MPa.
Figure 5:
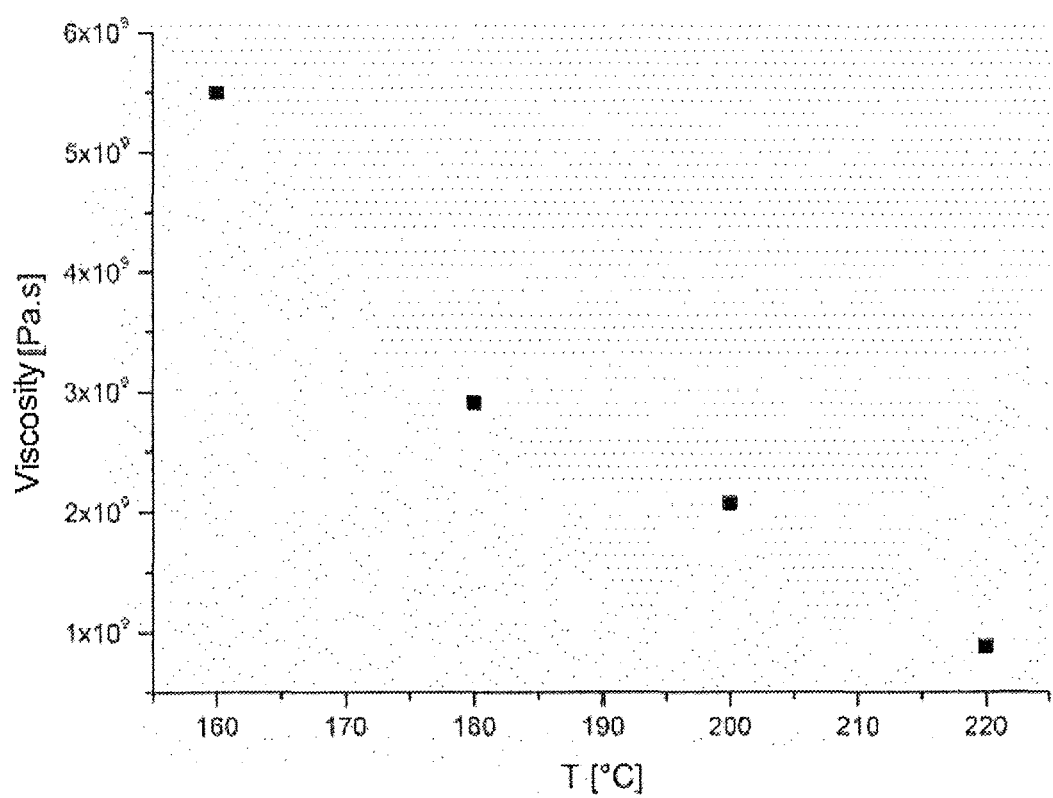
FIG. 5 shows the curve of viscosity of the material of example 1 as a function of the temperature.

The material has on DSC a Tg of the order of 70° C. ($\Box Cp$=0.4 $Jg^{-1}K^{-1}$) and a storage modulus of 2.4 GPa at 40° C. and of 15 MPa at 100° C. Creep experiments at different temperatures as represented in FIG. 4 make it possible to determine the viscosity of the material. These viscosity measurements, which result in the curves of FIG. 5, enable a person skilled in the art to determine precisely the working conditions of the material at a given temperature.

Example 2

Transformation of the Material by Hot Fashioning

Mounting

The plate prepared in example 1 is softened by heating using a hot air gun (T 140° C.), while taking care to avoid local overheating, and is then cut into strips using a guillotine. A strip 100 mm×8 mm×1.4 mm in size is held at its two ends by two Teflon clamps. The assembly is placed on a frame constructed such that 1°) one of the clamps is integrally attached to the frame, 2°) the second clamp, facing the first, is placed at the end of a mobile axle which allows it to move in translation and in rotation, and 3°) the frame may be placed in a transparent tubular oven of the Büchi TO-50 type equipped with a nitrogen inlet and a chromel/alumel thermocouple which makes it possible to know the effective temperature in the vicinity of the sample.

In order to observe the birefringence of the sample in the course of the experiment, the oven is placed between two crossed polaroids and backlit using a negatoscope, and the images are recorded using a digital camera.

The nominal temperature is set at 200° C. During heating, the position of the mobile clamp is adjusted so that the strip remains taut despite the expansion. It is noted that, after equilibration, the temperature effectively prevailing in the vicinity of the sample is between 160 and 180° C. The clamp is then maneuvered from the exterior by the operator to deform the sample.

Results

By rotating the mobile clamp, a torsion of ¾ of a turn is applied in the space of two minutes. At this strain, the mechanical birefringence reveals highly colored zones close to the axis of the sample and close to the edges of the sample and two neutral lines (dark and sparingly colored) about halfway between the axis of the sample and the edges. After 40 minutes, it is observed, by comparison of the photos, that the neutral line becomes broadened and that the colors disappear, leaving behind a birefringence figure in gray shades. A larger strain is then applied stepwise: 1 turn and then 1.5 turns and then 2 turns, while leaving to stand each time for at least 20 minutes. At each new strain, the birefringence colors reappear. These colors then disappear again in the same way as previously. After waiting for 40 minutes after the application of the largest strain (2 turns), although the birefringence has not totally disappeared, the mobile clamp is released. It is noted that the sample does not regain its initial flat strip shape, but conserves a helical strain with a residual torsion of about 1.5 turns.

Comparative Example 1 with 0.1% Catalyst

A comparative sample is prepared by using the same protocol as in example 1, but using a smaller mass of catalyst: 0.016 g of zinc acetylacetonate, i.e. 0.001 gram-atom of zinc per epoxy function. An attempt is made to transform this sample in the same way as in example 2. Thus, to begin with, a strain of ¾ of a turn is applied. The sample thus deformed is maintained at 160-180° C. After 40 minutes, it is found that the birefringence image is still brightly colored. An attempt is then made to apply a strain of 1 turn, as in example 1, but the sample breaks immediately at this strain.

Example 3

Epoxy-Anhydride Network According to the Invention with 10% Catalyst

Figure 6:
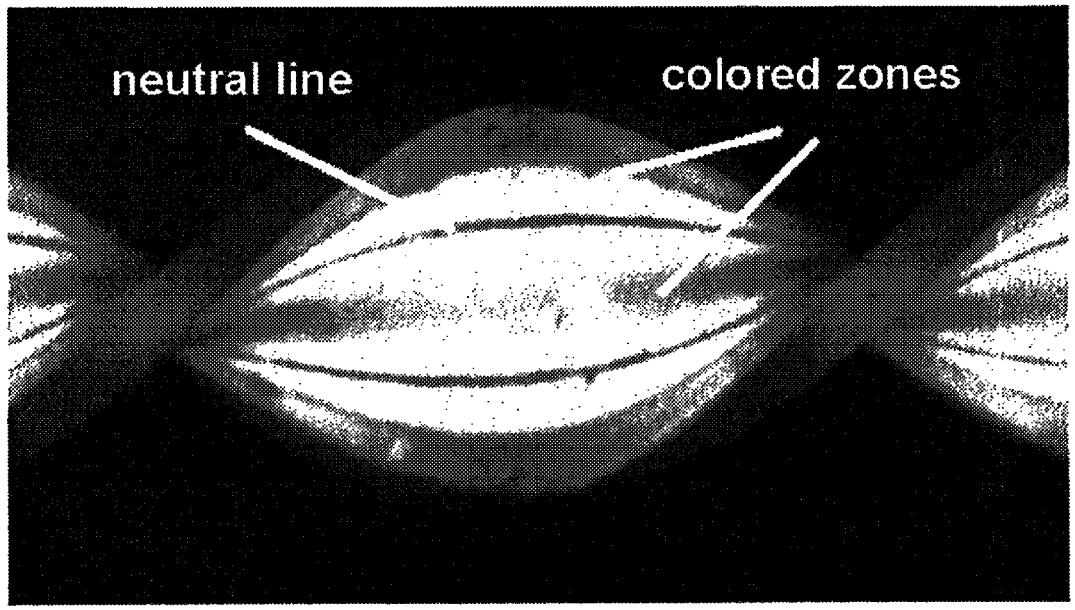
FIGS. 6*a* and 6*b* are photographs of a strip of material of the invention observed under polarized light, to which is applied a mechanical stress of torsion type according to example 3.
Figure 6:
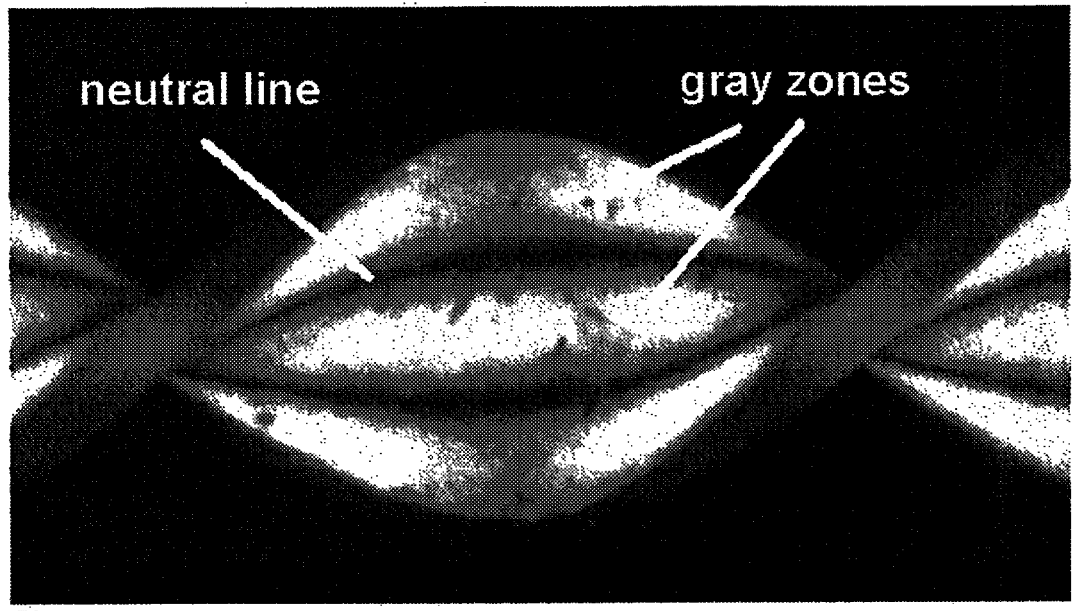

The process is performed as in example 1, but with twice the amount of catalyst. A sample 100 mm×8 mm×1.4 mm in size is manipulated as in example 2. It is found in this case that the birefringence colors induced by a helical strain (FIG. 6a) disappear within 15 minutes, leaving behind a birefringence figure in gray shades (FIG. 6b). By proceeding stepwise and allowing to relax for at least 10 minutes between each step and 40 minutes after the final step, torsions of 1 turn, 1.5 turns, 2 turns, 2.25 turns, 2.5 turns, 2.75 turns and then 3 turns are successively applied. After cooling, the sample has a strain of 3 turns. After immersing in boiling water for 2 minutes, the torsion remains greater than 2.95 turns.

Example 4

Epoxy-Anhydride Network According to the Invention with 10% Catalyst

Imposition of Two Successive Strains of Different Nature: Torsion and then Flexion Starting with the same material as in example 3, a strip 100 mm×4 mm×1.4 mm in size is prepared. The sample is first subjected to a torsion of 5 turns in the same way as in example 3. The twisted strip obtained (FIG. 7a) is cooled to room temperature and then attached tangentially to a Teflon cylinder 2.5 cm in diameter. This cylinder is placed on an axle perpendicular to the axis of the oven described in example 2. The other end of the twisted strip is weighted with a weight of 7 g. The assembly is placed in the oven and heated as in example 2. A flexural strain is then applied by rotating the cylinder on its axle. After cooling and immersing in boiling water, the object obtained is an open ring whose cross section is a twisted strip (FIG. 7b).

Preparation of an Object of Programmable Shape:

The preceding object is softened using a hot air gun, and deformed so as to form a closed ring as shown in FIG. 7c, and then cooled to room temperature. The object obtained, while it is maintained at room temperature, conserves the shape of FIG. 7c. However, when it is immersed in boiling water, it regains the shape of FIG. 7b.

This example shows that it is possible to apply to the initial object (a strip) several successive strains, and then to restore to this object a shape envisaged beforehand by simply raising the temperature.

Example 5

Recycling of the Material According to the Invention by Milling

About 3 g of material prepared according to example 3 are reduced to powder with a particle size <0.5 mm using a Pulverisette 14 model Fritsch brand mill operating at a speed of 10 000 rpm. The powder obtained is pressed using a heating press in a circular mold of diameter 20 mm and thickness 1.5 mm, by working with a pressure of 5 tonnes at a temperature of 250° C. and for a period of 30 seconds. The mold is removed from the press and the samples are stripped from the mold while they are still hot. The samples thus molded keep the dimensions of the mold, are transparent and have excellent cohesion (FIG. 8).

Example 6

Repair of an Object Based on Epoxy Resin According to the Invention

Four materials according to the invention are synthesized according to the protocol of example 1, but with a variable ratio of the anhydride functions relative to the epoxy functions as indicated in table 2 below:

TABLE 2

|  | DGEBA DER 332 | Glutaric anhydride | $Zn(acac)_2 \cdot 2H_2O$ | Anhydride/ epoxy ratio |
| --- | --- | --- | --- | --- |
| Synthesis 1 | 9.1 g (52.1 mmol) | 5.94 g (52.1 mmol) | 0.69 g (2.6 mmol) | 1 |

TABLE 2-continued

| | DGEBA DER 332 | Glutaric anhydride | Zn(acac)$_2$•2H$_2$O | Anhydride/ epoxy ratio |
|---|---|---|---|---|
| Synthesis 2 | 9.6 g (55.1 mmol) | 4.71 g (41.3 mmol) | 0.73 g (2.8 mmol) | 0.75 |
| Synthesis 3 | 10.4 g (60.0 mmol) | 4.56 g (40.0 mmol) | 0.79 g (3.0 mmol) | 0.66 |
| Synthesis 4 | 10.7 g (61.4 mmol) | 3.51 g (30.7 mmol) | 0.81 g (3.1 mmol) | 0.5 |

A rectangular strip 50 mm×5 mm×1.4 mm in size is cut from each material. The strip is broken in the middle and the two fragments are placed one on top of the other, overlapping over a length of 15 mm, and are then compressed in Mohr clamps in a geometry analogous to standard ASTM D3983. In order to control the applied pressure, the central screw of diameter 6 mm and of pitch 1 mm is replaced with a hexagonal-headed screw of the same dimension to which is applied a torque of 70 (±10) N/cm using a tensile testing screwdriver. The assembly is baked at 150° C. for 2 hours.

Figure 9:
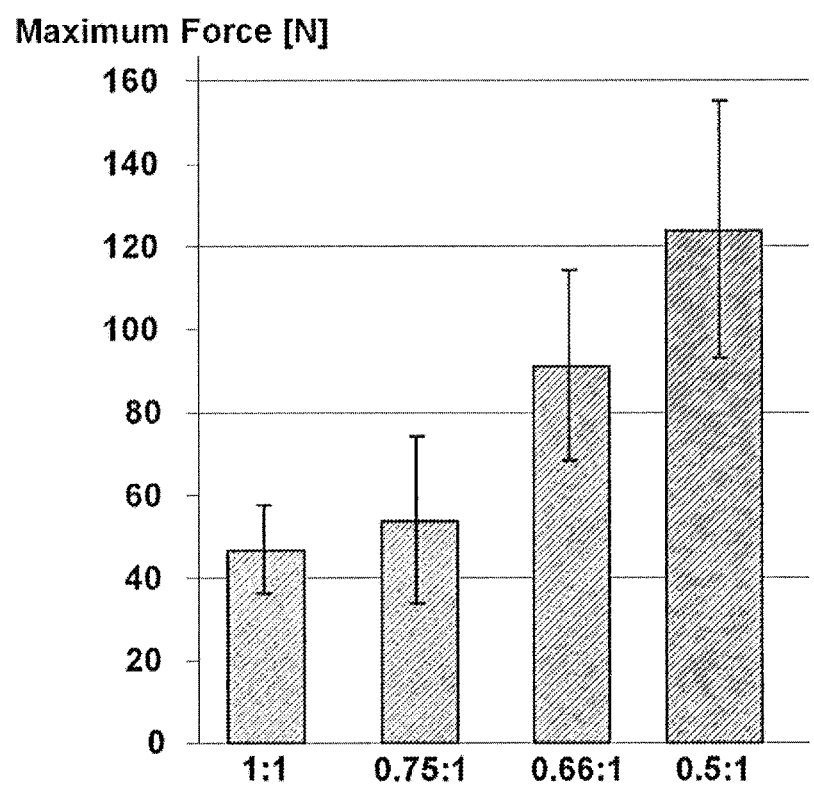
FIG. 9 shows results of the tensile tests performed on the samples of example 6 (the samples are named according to the anhydride/epoxy ratio) after repair. The maximum force before failure (in N) is representative of the efficacy of the repair. It is a mean of five measurements, and the error bar corresponds to the standard deviation of the measurements.

The sample is then drawn at room temperature in an Instron tensile testing machine with a speed of 0.1 mm per minute. The maximum force sustained by the assembly and the elongation at break are measured. This method makes it possible to quantify the adhesion between the two samples and to evaluate the repair of the assembly. The results are presented in FIG. 9. This assembly shows the possibility of repairing a part made of thermoset resin according to the invention or of assembling two parts made of material according to the invention. This example also shows the improvement in the properties when the number of hydroxyl functions generated by the epoxy+anhydride reaction is increased, this number being proportionately greater the lower the anhydride/epoxy ratio.

The invention claimed is:

1. A material resulting from the hardening of a thermosetting resin, the thermosetting resin formed by contacting:
   a composition comprising at least one thermosetting resin precursor, wherein the thermosetting resin precursor comprises hydroxyl functions and/or epoxy groups, and optionally ester functions,
   with a composition comprising at least one hardener chosen from acid anhydrides,
   in the presence of at least one transesterification catalyst whose total molar amount is between 5% and 25% of the total molar amount of hydroxyl and epoxy contained in the thermosetting resin precursor, wherein the catalyst is dissolved in the composition comprising the thermosetting resin precursor or in the composition comprising the hardener,
   wherein the amount of hardener is such that the resin is in the form of a network, and $2N_A < N_O + 2N_x$ wherein:
   $N_O$ is the number of moles of hydroxyl functions in the precursor,
   $N_x$ is the number of moles of epoxy groups in the precursor, and
   $N_A$ is the number of moles of anhydride functions of the hardener that are capable of forming a bond with a hydroxyl function or with an epoxy group of the thermosetting polymer precursor,
   wherein the material has a storage modulus between $5 \times 10^5$ and $5 \times 10^7$ Pa above the glass transition temperature Tg of the resin, and wherein the material is thermoformed by applying a mechanical constraint at a temperature above the glass transition temperature of the material.

2. The material according to claim 1, wherein $2N_A > N_x$.

3. The material according to claim 2, wherein the thermosetting resin precursor is chosen such that:

$2 < 2 < n_X > + < n_O >$ wherein:
   $<n_X>$ is the numerical average of the number of epoxy functions per precursor, and
   $<n_O>$ is the numerical average of the number of hydroxyl functions per precursor.

4. The material according to claim 1, wherein the thermosetting resin precursor is an epoxy resin precursor.

5. The material according to claim 4, wherein the epoxy resin precursor is a bisphenol A diglycidyl ether or a novolac epoxy resin.

6. The material according to claim 1, wherein the hardener is chosen from glutaric anhydride, phthalic anhydride, and hexahydrophthalic anhydride.

7. The material according to claim 1, wherein the catalyst is chosen from zinc acetylacetonate and benzyl dimethylamine.

8. The material according claim 1, further comprising at least one component chosen from: polymers, pigments, dyes, fillers, plasticizers, fibres, flame retardants, antioxidants, lubricants, wood, glass, metals.

9. An article comprising the material according to claim 1.

10. A material resulting from the hardening of a thermosetting resin, the thermosetting resin formed by contacting:
    a composition comprising at least one thermosetting resin precursor, wherein the thermosetting resin precursor comprises hydroxyl functions and/or epoxy groups and optionally ester functions,
    with a composition comprising at least one hardener chosen from acid anhydrides,
    in the presence of at least one transesterification catalyst, whose total molar amount is between 5% and 25% of the total molar amount of hydroxyl and epoxy contained in the thermosetting resin precursor, wherein the catalyst is dissolved in the composition comprising the thermosetting resin precursor or in the composition comprising the hardener,
    wherein the amount of hardener is such that the resin is in the form of a network, and $2N_A < N_O + 2N_x$ wherein:
    $N_O$ is the number of moles of hydroxyl functions in the precursor,
    $N_x$ is the number of moles of epoxy groups in the precursor, and
    $N_A$ is the number of moles of anhydride functions of the hardener that are capable of forming a bond with a hydroxyl function or with an epoxy group of the thermosetting polymer precursor,
    wherein the material has a viscosity between $10^5$ and $10^{10}$ Pa·s at temperatures between 150 and 300° C., and
    wherein the material is thermoformed by applying a mechanical constraint at a temperature above the glass transition temperature of the material.

11. The material according to claim 10, wherein $2N_A > N_x$.

12. The material according to claim 11, wherein the thermosetting resin precursor is chosen such that:

$$2<2<n_X>+<n_O>$$

wherein:
- $<n_X>$ is the numerical average of the number of epoxy functions per precursor, and
- $<n_O>$ is the numerical average of the number of hydroxyl functions per precursor.

13. The material according to claim 10, wherein the thermosetting resin precursor is an epoxy resin precursor.

14. The material according to claim 13, wherein the epoxy resin precursor is a bisphenol A diglycidyl ether or a novolac epoxy resin.

15. The material according to claim 10, wherein the hardener is chosen from glutaric anhydride, phthalic anhydride, and hexahydrophthalic anhydride.

16. The material according to claim 10, wherein the catalyst is chosen from zinc acetylacetonate and benzyl dimethylamine.

17. The material according to claim 10, further comprising at least one component chosen from: polymers, pigments, dyes, fillers, plasticizers, fibres, flame retardants, antioxidants, lubricants, wood, glass, metals.

18. An article comprising the material according to claim 10.

* * * * *